United States Patent [19]

Raubenheimer

[11] 3,928,202

[45] Dec. 23, 1975

[54] APPARATUS FOR CLEANING THE SURFACE OF A LIQUID

[75] Inventor: Johann Nicolaas Raubenheimer, Bedfordview, South Africa

[73] Assignee: Peacock Investments (Proprietary) Limited, Johannesburg, South Africa

[22] Filed: July 19, 1974

[21] Appl. No.: 490,030

[30] Foreign Application Priority Data

July 26, 1973 South Africa.......................... 73/5112
Sept. 7, 1973 South Africa.......................... 73/7147

[52] U.S. Cl.................................. 210/169; 15/1.7
[51] Int. Cl.².......................................... E04H 3/20
[58] Field of Search .......... 210/65, 169, 242; 15/1.7

[56] References Cited
UNITED STATES PATENTS

| | | | |
|---|---|---|---|
| 3,384,914 | 5/1968 | Wilhelmsen | 15/1.7 |
| 3,676,885 | 7/1972 | Wulc | 15/1.7 |
| 3,701,427 | 10/1972 | Howard | 210/169 |
| 3,758,276 | 9/1973 | Bond et al. | 15/1.7 |
| 3,767,055 | 10/1973 | Flatland | 210/169 |
| 3,790,979 | 2/1974 | Foster | 15/1.7 |
| 3,803,658 | 4/1974 | Raubenheimer | 15/1.7 |
| 3,822,754 | 7/1974 | Hankin et al. | 15/1.7 |

FOREIGN PATENTS OR APPLICATIONS 590,252 1/1960 Canada.............................. 210/169

Primary Examiner—Theodore A. Granger
Attorney, Agent, or Firm—Karl W. Flocks

[57] ABSTRACT

This invention concerns an apparatus for cleaning the surface of a liquid particularly a swimming pool. The apparatus comprises a hollow body member which will float partly on the surface of the liquid, said body member having a liquid inlet for permitting surface liquid to pass into a filter chamber in the interior of the hollow body member, and a liquid outlet for permitting liquid to pass out from the filter chamber, liquid displacing means for causing liquid to move from the liquid inlet to the liquid outlet, a filter positioned in the filter chamber between the liquid inlet and liquid outlet, and means for causing the apparatus to move in a substantially horizontal plane. Means may be provided for causing the apparatus to change direction.

4 Claims, 4 Drawing Figures

APPARATUS FOR CLEANING THE SURFACE OF A LIQUID

This invention relates to an apparatus for cleaning the surface of a liquid, for example water. The apparatus is particularly suitable for cleaning the surface of swimming pools, but may for example also be used in cleaning the surface of other expanses of water.

The present invention provides an apparatus for cleaning the surface of a liquid, said apparatus comprising a hollow body member adapted to float partly on the surface of the liquid, a liquid inlet for permitting surface liquid to pass into a filter chamber in the interior of the hollow body member, a liquid outlet from the filter chamber, liquid displacing means for causing liquid to move from the liquid inlet to the liquid outlet, a filter positioned in the filter chamber between the liquid inlet and liquid outlet, and means for causing the apparatus to move in a substantially horizontal plane.

The invention also provides a method of cleaning the surface of a liquid, which comprises providing, in the liquid, an apparatus comprising a hollow body member which floats partly on the surface of the liquid, said apparatus having a liquid inlet at about the surface level into a filter chamber and a liquid outlet from the filter chamber below surface level, causing liquid to pass through the inlet and out of the outlet, and causing the apparatus to move in a substantially horizontal plane.

The means for moving the apparatus about on the surface of the liquid may be powered. It may comprise a motor mounted on the apparatus, or it may comprise a suction cleaning device connected to the apparatus and capable of moving over and cleaning surfaces continuously or intermittently beneath the level of the liquid. The suction cleaning device may have a floating body member which itself is moved continuously or intermittently about on the surface of the liquid, or may be the inventor's device described in South African Pat. No. 71/231 and corresponding U.S. Pat. No. 3,803,658 and U.K. Pat. No. 1,340,816. For example, the body member may contain a suction chamber which has an inlet and an outlet, the inlet of the suction chamber being connected to a flexible hose from the suction cleaning device. The outlet from the suction chamber can be connected to a further flexible hose which itself leads to a suction applying means, eg the pump of a swimming pool filter.

The suction chamber may contain a turbine which can be rotated by liquid sucked into the chamber to impinge on the turbine, eg at substantially the level of the turbine. The turbine may drive the means, for example an impeller, which causes the liquid to pass from the inlet to the outlet of the filter chamber. By having the filter chamber separate from the suction chamber, the filtered liquid may be discharged back into the rest of the liquid without passing through the pump which is sucking up the liquid from the cleaning device. The discharge of cleaned surface liquid back into the rest of the liquid conveniently is below the surface level thereof, eg by about 25 cm.

The hollow body member may contain a floating weir capable of preventing the liquid passing into the filter chamber when no suction is applied to the suction chamber. The hollow body member may also contain a chlorination device, for example when the apparatus is used for skimming the surface of a swimming pool. In this embodiment, the cleaning of the sides and bottom of the pool, the skimming clean of the surface, and the chlorination of the water can be carried out by means of one combined apparatus. Any of the usual chlorinating agents, (eg calcium hypochlorite) may be used in the apparatus, which should be made of a material resistant to corrosion by chlorine if it is to be used in this manner. Plastics materials are particularly suitable.

The apparatus may also include means for enabling the movement of the apparatus in a substantially horizontal plane to change direction. This may be by an automatic means. In one embodiment, this may comprise a pair of spaced-apart inlet holes in the suction chamber, and valve means for closing one or other of the holes. The open hole may be used as the entry hole for liquid to drive the turbine.

In one presently preferred embodiment, the valve means comprises a spindle having a washer pad at either end, the spindle being slideable axially to close one or other of the holes. Conveniently, a chance means is provided for causing one or other hole to open. The chance means may comprise, in combination, a freely rotatable dogwheel mounted on the spindle and also movable axially with the spindle, a small hole positioned in the suction chamber wall of the body member and through which liquid can enter and rotate the dogwheel, and a gearwheel mounted to be rotatable by the turbine in the suction chamber, said gearwheel having a projecting stop which can abut against the dogwheel when the latter is in a particular position thereby causing the direction of rotation of the turbine to alter.

The means for causing the apparatus to alter direction may comprise means for applying torque to the flexible hose connected to the inlet to the suction chamber. This means may be a chance means, for example the inlet from the cleaning device to the suction chamber may be rotatable. Thus the inlet may comprise a rotatable sleeve. Rotation may be caused by means of the turbine present in the suction chamber.

The invention is illustrated by reference to the accompanying drawings, in which.

Figure 1:
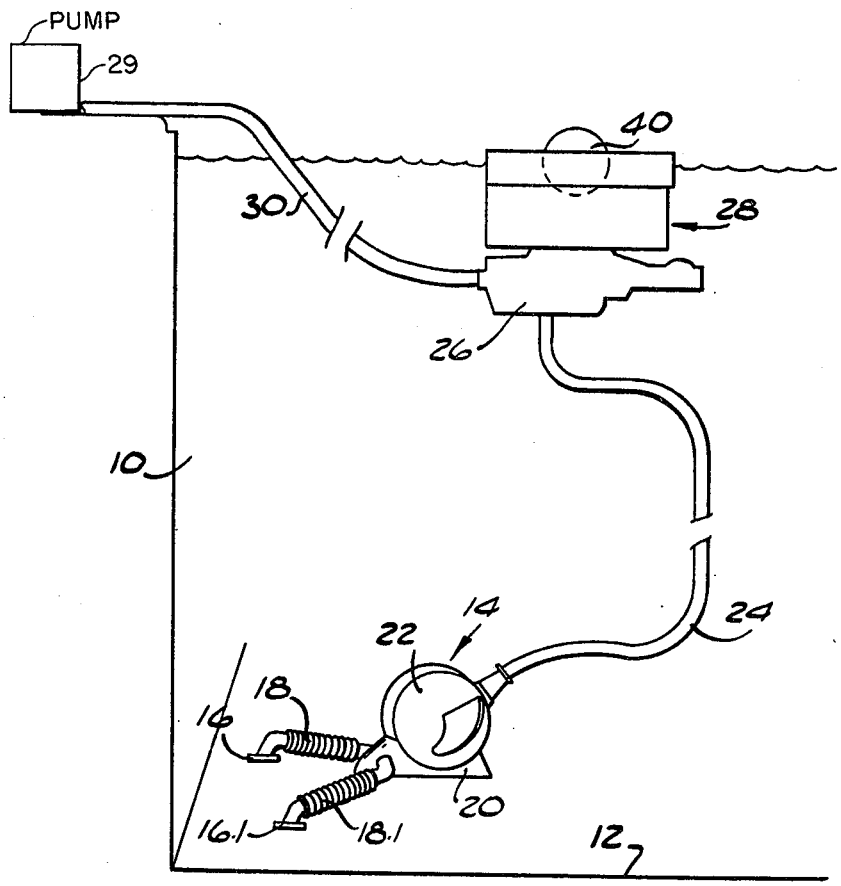
FIG. 1 is a schematic view of an apparatus according to the invention and a pool cleaning device in use cleaning a swimming pool.

In FIG. 1, a swimming pool has wall 10 and floor 12. A suction cleaning device 14 has suction heads 16, 16.1 connected by flexible hoses 18, 18.1 to a main head 20 containing a flywheel chamber 22 into which short hoses 18, 18.1 and long flexible hose 24 lead. The flexible hose 24 leads to suction chamber 26 of a surface cleaning apparatus 28 according to the invention. A further flexible hose 30 leads from the suction chamber 26 to a pump 29 for filtering the water of the swimming pool.

Figure 2:
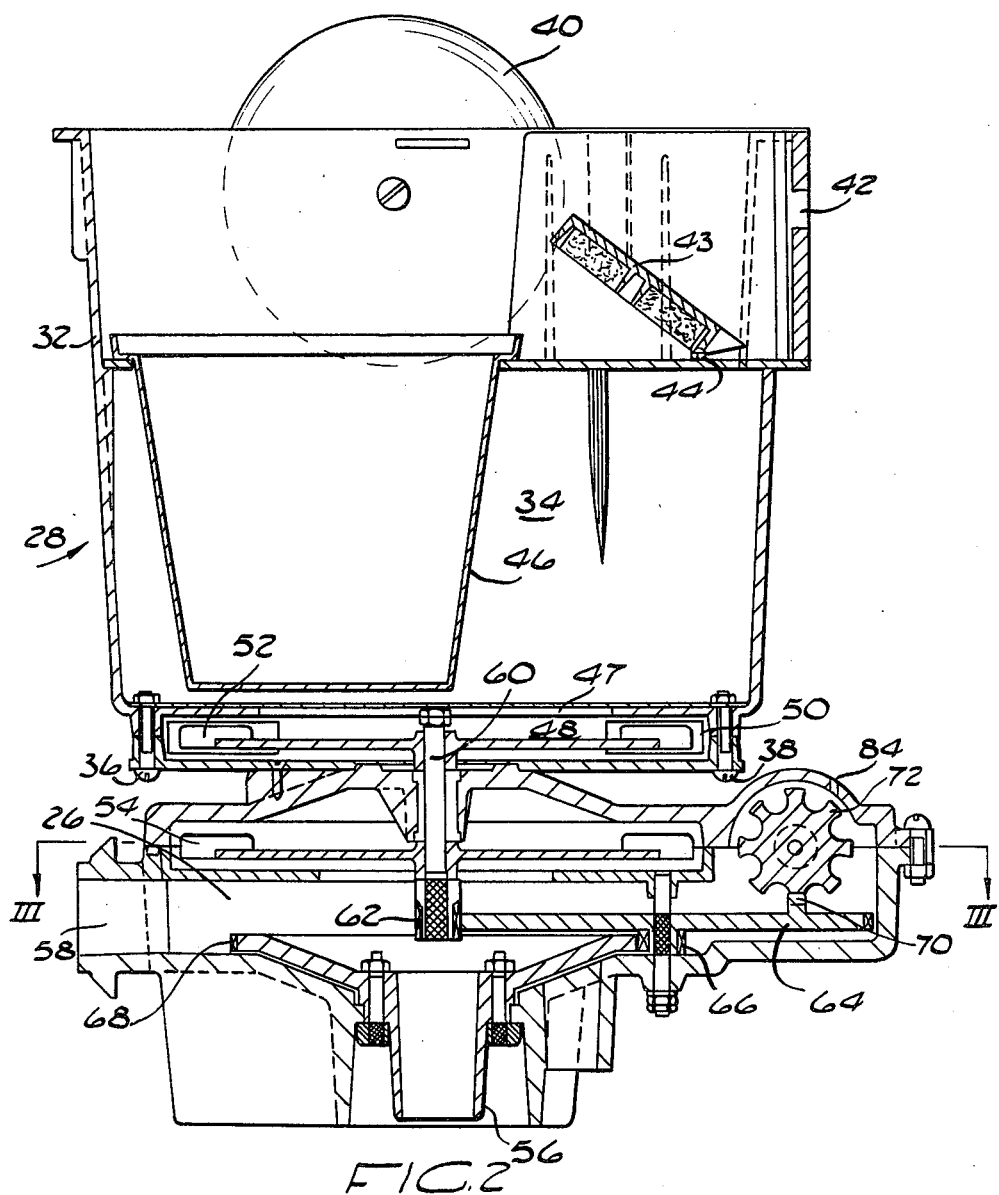
FIG. 2 is a vertical cross-section through one embodiment of an apparatus according to the invention.
Figure 3:
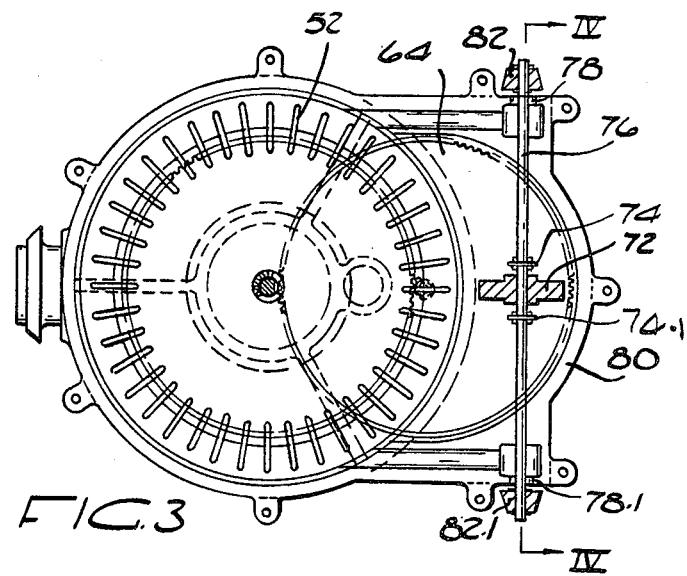
FIG. 3 is a section along III — III of FIG. 2.
Figure 4:
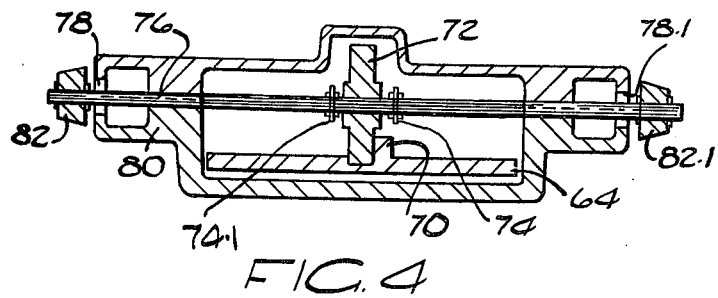
FIG. 4 is a section along IV — IV of FIG. III.

Referring now to FIGS. 2 to 4, the apparatus 28 comprises a body member 32 containing a filter chamber 34 and a suction chamber 26. The two parts of the body member 32 (ie the two chambers) are bolted together by means of bolts 36, 38. The body member 32 is attached to a buoyant float 40 to maintain inlet 42 into the filter chamber 34 in the surface of the water. A floating weir 43, pivoted at 44, limited the water entering the filter chamber 34.

The filter chamber 34 contains a filter basket 46, and has an outlet 47 into impeller chamber 48. The impeller chamber 48 has an outlet 50 to the pool, and contains an impeller 52.

Below the impeller chamber 48 is the suction chamber 26 in which a turbine 54 is mounted for rotation. A rotatable hose connector in the form of a sleeve 56 provides the inlet into the suction chamber from hose 24 of FIG. 1, and outlet 58 from the suction chamber 36 is connected to hose 30 of FIG. 1. The turbine 54 has a spindle 60 on which the impeller 52 also is mounted to be rotatable therewith.

A gearwheel 62 at the bottom end of the spindle 60 meshes with teeth of a gearwheel 64, which itself has further teeth 66 meshing with teeth 68 of the rotatable hose connector sleeve 56. The gearwheel 64 has an upwardly-extending stud 70 which can pass through gaps in a dogwheel 72 mounted on spindle 76 (see FIGS. 3 and 4).

The dogwheel 72 is rotatable about spindle 76 but is prevented from longitudinal movement by circlips 74, 74.1. The spindle 76 passes through holes 78, 78.1 in casing 80. Washer pads 82, 82.1 are mounted on the ends of the spindle 76 for closing one or other of the holes 78, 78.1. Water passing through the open hole (78 or 78.1) causes the turbine to rotate clockwise or anti-clockwise. A small hole 84 is positioned to enable a jet of water to be sucked through the hole 84 and impinge on the dogwheel 72 when it is in line with the small hole 84.

In use, the pool pump sucks water up through the hole 24. The suction effect occurring in the suction chamber 26 causes water to be drawn through hole 78 or 78.1, thereby causing movement of the turbine 54. This in turn drives the impeller 52, the gearwheel 64 and the hose connector sleeve 56. Due to the movement of the impeller, surface water is moved from the inlet 42 to be filtered by the basket 46, and passes out of outlet 50 into the pool below the surface thereof without passing through the pool pump.

As mentioned above the surface cleaning apparatus or 'skimmer' 28 is moved along by the movement of the cleaning device 14. The flywheel in the flywheel chamber 22 contains a part (not visible) which cuts off suction to the heads 16, 16.1 once per revolution, and this causes the heads momentarily to come away from the floor surface 12 once per revolution of the flywheel. This in turn makes the flexible hose 24 jerk, causing the apparatus 28 to move.

The hose 24 twists and snakes due to the rotation of the sleeve 56 and this imparts directional movement to the suction cleaning device 14, and hence also pushes or pulls the skimmer apparatus in a certain direction. When the stud 70 abuts against a tooth of the dogwheel 72, an impulse is imparted to the spindle 76, sliding it longitudinally to open the other of holes 78, 78.1. This reverses the direction of rotation of the turbine 54, and hence of the sleeve 56. An opposite direction of rotation of the turbine is thereby imparted to the hose 24, which changes the direction of movement of the device 14 and apparatus 28. The change is such that on completion of rotation of the gearwheel 64, the stud 70 may or may not abut against the dogwheel 72, and the direction of movement may or may not be reversed. When the dogwheel 72 is axially displaced, the spindle 76 and pads 82, 82.1 are axially displaced so that an opposite hole 78 or 78.1 is opened and the direction of the turbine is reversed.

Given sufficient period of time, an arbitrary movement automatically of the apparatus 28 occurs over the surface of the pool.

Arbitrary factors, mainly differential water pressure and the venturi effect of water sucked into either hole 78 or 78.1 ensure that one of the holes to these passages is always closed.

If desired, the arrangement may be such that the probability of rotation of the gearwheel 64 in one direction is greater than for the other direction. This may be done, for example, where the hose 30 has a natural tendency to coil up in one direction rather than in the other direction. This coiling can be offset by tapering the sides of the teeth of the dogwheel 72 thus increasing the probability of rotation of the gearwheel 64 in the one direction above that for rotation in the other direction.

The number of times that a reversal of direction of rotation of the gearwheel 64 will occur may be varied by providing more than one stud.

Bristles may be provided on the underwater suction hose 24 to clean the sides of the pool as the hose is randomly coiled and uncoiled.

I claim:

1. Apparatus operative in a tank having sidewalls and a bottom for cleaning the bottom of the tank and the surface of a body of liquid within the tank comprising
   a pump located near the sidewall of the tank for withdrawing liquid therefrom,
   first flexible conduit means in fluid communication with said pump and with liquid surface cleaning means for floating on the surface of the body of liquid,
   second flexible conduit means with a first end connected to said liquid surface cleaning means and a second end in fluid communication with tank bottom cleaning means, said conduit first end being in fluid communication with said first flexible conduit means at its end connected to said liquid surface cleaning means,
   said liquid surface cleaning means including a float supported chamber with filter means located therein for collecting debris from the surface of the body of liquid, inlet means in a sidewall of said chamber in fluid communication with an inlet side of said filter means, turbine blade means located in a lower region of said chamber for operating impeller means to induce liquid flow through said inlet means into said filter means and out of an outlet constructed and arranged in a sidewall of said chamber, second inlet means in said surface cleaning means separated from said outlet and constructed and arranged for said pump to cause liquid flow through said second inlet means and against said turbine blade means for operatively rotating said impeller means,
   said tank bottom cleaning means including chamber means connected to said second end of said second conduit, said chamber means being constructed and arranged for being randomly pulled over the bottom of a tank by said second flexible conduit means connected to said floating liquid surface cleaning means by the movement of said surface cleaning means,
   inlet means provided into the interior of said chamber means of said tank bottom cleaning means whereby liquid near the bottom of the tank induced to flow into said inlet means of said chamber means by the suction of said pump communicated to said bottom cleaning chamber means through said first and second flexible conduit means removes debris from the bottom of a tank for discharge through said pump.

2. The apparatus of claim 1 further characterized by said second inlet means including spaced apart holes, valve means for closing one or the other of said spaced apart holes,
whereby liquid entering one of said spaced apart holes causes rotation of said turbine means in a clockwise direction and liquid entering the other of said spaced apart holes causes rotation of said turbine means in a counterclockwise direction.

3. The apparatus of claim 2 further characterized by valve means being mounted at opposite ends of a spindle which is slidable axially of said two spaced apart holes, and a random chance means for causing one or the other of said spaced apart holes to be open comprising a gear wheel rotatable by said turbine means, said gear wheel having a projecting stop which can abut against a dogwheel mounted on the axially-slidable spindle when said dogwheel is in a particular position, said dogwheel being positioned adjacent to a small hole in said chamber through which a jet of liquid is sucked to rotate said dogwheel whenever said dogwheel does not abut against said projecting stop.

4. The apparatus of claim 3 further characterized by said first end of said second flexible conduit connected to a rotatable sleeve of said surface cleaning means,
said sleeve connected to be rotated by said turbine means through said gear wheel.

* * * * *